United States Patent [19]
Svehla et al.

[11] 3,712,670
[45] Jan. 23, 1973

[54] ACCESSORY ATTACHMENTS FOR MOTORCYCLES AND THE LIKE

[76] Inventors: Paul W. Svehla, 3985 LaCrescenta Road, El Sobrante, Calif. 94803; Samuel R. McQuisten, 933 Oxford Street, Berkeley, Calif. 94707

[22] Filed: July 15, 1971

[21] Appl. No.: 162,877

[52] U.S. Cl. ..................297/195, 297/214, 297/250, 297/459
[51] Int. Cl. ............................B62j 1/00, A47c 1/08
[58] Field of Search......297/195, 202, 214, 230, 231, 297/250, 252, 452, 458, 454, DIG. 1; 24/73 PF, 255 TC; 248/361 A; 5/345

[56] References Cited

UNITED STATES PATENTS

| 3,463,547 | 8/1969 | Brennen et al. | 297/459 |
| 3,139,308 | 6/1964 | Hershberger et al. | 297/DIG. 1 |
| 3,337,884 | 8/1967 | Meier | 5/345 |
| 3,341,251 | 9/1967 | Costin | 297/452 |
| 3,588,171 | 6/1971 | Rich, Jr. | 297/214 |

Primary Examiner—Casmir A. Nunberg
Attorney—Robert J. Schaap

[57] ABSTRACT

An accessory seat attachment for removable securement to two-wheeled motor vehicles, such as motorcycles and the like. The seat attachment is formed of a frame member which somewhat conforms to the buttocks of the human body when in the seated position. The frame is provided with an enlarged aperture in the region which would be capable of engaging the buttocks of a human body and a foam-like cushion is secured to the frame and completely covers the enlarged aperture in the shell. The plastic shell is also provided with a pair of elongated slots for accommodating hooks which are engageable with the vehicle for removably securing the seat attachment to the vehicle.

18 Claims, 8 Drawing Figures

PATENTED JAN 23 1973  3,712,670

INVENTORS:
PAUL W. SVEHLA
SAMUEL R. McQUISTEN
BY Robert J. Schaap
ATTORNEY.

ACCESSORY ATTACHMENTS FOR MOTORCYCLES AND THE LIKE

BACKGROUND OF THE INVENTION

This invention relates in general to certain new and useful improvements in accessory seat attachments for motor vehicles, and more particularly, to a seat attachment capable of being removably secured to two-wheeled vehicles, such as motorcycles and the like.

In recent years, motorcycles, motorbikes and similar two-wheeled motor vehicles have become quite popular as a pleasure vehicle and are quite commonly involved in amateur sports and various leisure time activities. Furthermore, a fairly substantial segment of the population relies upon the use of these two-wheeled motor vehicles as a mode of travel, in addition to, or in place of, the conventional automobile.

Many of these two-wheeled vehicles are equipped with an elongated seat which is somewhat rectangular in shape. The user or occupant of the motor vehicle is supported on the elongated seat of the vehicle in such a manner that the buttocks of the occupant are engaged by the upper surface of the elongated seat and the legs of the occupant essentially straddle the seat. Furthermore, the seat may have a length sufficient to support two or more occupants of the motor vehicle.

One of the problems inherent in this type of seat structure is that the user of the vehicle must balance himself on the seat and establish a position on the seat in such manner that his weight is not substantially skewed with respect to the vertical axis of equilibrium of the vehicle. In addition, this type of seat structure is quite uncomfortable for the occupant, particularly when the occupant drives the vehicle for any appreciable distance. One of the principle dilemmas presented to the owners of these vehicles is that the seats are constructed in such fashion that they cannot be readily removed and replaced by another type of alternative seat structure.

The present invention obviates this problem by the provision of a seat attachment which can be conveniently and rapidly attached, in removable fashion, to the existing seat structure of motorcycles and similar two-wheeled motor vehicles.

It is therefore the primary object of the present invention to provide a seat attachment which is capable of being removably attached to motorcycles and similar two-wheeled motor vehicles.

It is another object of the present invention to provide a seat attachment of the type stated which is formed of a structural shell or similar frame member and which is provided with a cushion-like member secured to the shell or frame member.

It is a further object of the present invention to provide a seat attachment of the type stated which is capable of being removably attached to the seat structure on a wide variety of two-wheeled motor vehicles.

It is also an object of the present invention to provide a seat attachment of the type stated which includes a cushion member forming part of the seat attachment and which operates in conjunction with a cushion member on the existing seat structure of the motor vehicle to render a cushioning effect to the occupant of the motor vehicle.

It is an additional object of the present invention to provide a seat attachment of the type stated which provides a frame member having an enlarged aperture and a cushion member disposed over the enlarged aperture in the frame member, and where the cushion member is yieldable somewhat to partially extend through the enlarged aperture under the weight of an occupant.

It is another salient object of the present invention to provide a seat attachment of the type described which can be manufactured on a mass production basis at a relatively low cost.

With the above and other objects in view, our invention resides in the novel features of form, construction, arrangement, and combination of parts presently described and pointed out in the claims.

In the accompanying drawings (1 sheet):

GENERAL DESCRIPTION

Figure 1:
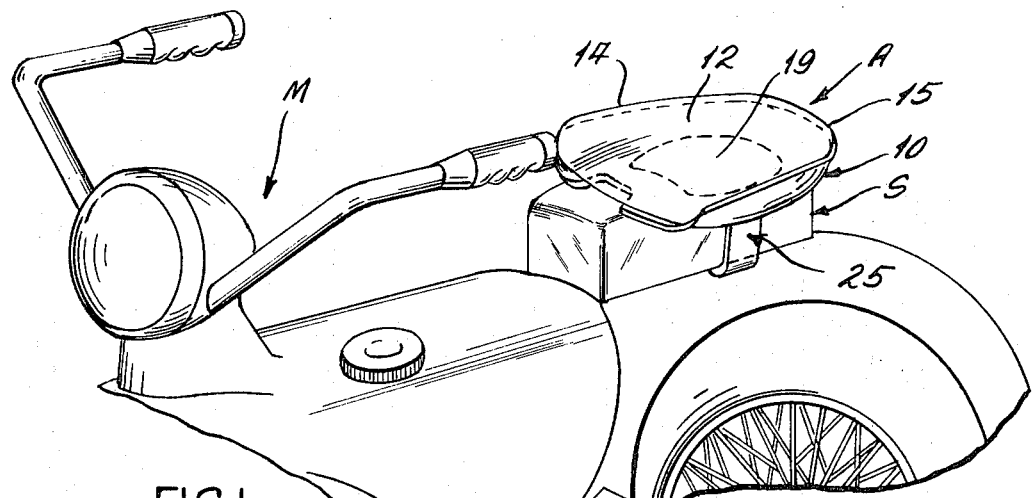
FIG. 1 is a perspective view of a portion of a motorcycle showing the seat attachment of the present invention secured to the existing seat structure of the motorcycle.

The present invention generally relates to an accessory seat attachment which may be removably secured to the existing elongated seat structure of two-wheeled motor vehicles, such as motorcycles, and the like. The accessory seat attachment generally includes a shell or frame somewhat similar to an equestrian type saddle and partially conforming to the buttocks of a human body when substantially in the seated position. The shell is formed by a somewhat U-shaped base wall having a connecting member which serves to connect the two legs of the U-shaped base wall. The shell is integrally provided with an upstanding member which extends around the rear margins and two side margins of the base wall.

The underside of the shell is partially conformable to the existing seat structure on the two-wheeled vehicle so that the shell may be readily supported on the existing seat structure in a relatively stable position. Furthermore, the U-shaped base wall and the connecting member form an enlarged centrally located aperture which is somewhat rectangular in shape. This enlarged aperture is located in the region of the shell which would be capable of engaging and supporting the buttocks of a human body when in the seated position.

A cushion is permanently secured to the interiorly presented or upwardly presented surface of the shell and is provided with a reduced thickness in the region of the enlarged aperture, so that a confined space exists between the portion of the cushion which is reduced in thickness and the upper surface of a cushion layer or pad on the existing vehicle seat structure. The cushion secured to the shell is constructed in such fashion that it is somewhat resilient or yieldable, so that a portion of this cushion can extend partially downward through the enlarged aperture and into the confined space under the weight of an occupant. In this manner, both the cushion on the frame and the cushion layer or pad on the existing seat structure cooperate to provide a relatively soft seating surface for the occupant of the vehicle.

A pair of elongated fasteners having shank portions with enlarged heads are used to removably secure the seat attachment to the existing seat structure of the vehicle. The shanks extend through elongated slots formed in the shell and the enlarged heads engage a pair of opposed retaining flanges for holding the fasteners in place. The fasteners are provided at the lower ends of the shanks with resilient curved hook-like flanges for engaging the lower margins of the existing vehicle seat structure. By means of this construction, the entire seat attachment can be conveniently and rapidly secured to the seat of the motor vehicle.

DETAILED DESCRIPTION

Referring now in more detail and by reference characters to the drawings which illustrate a preferred embodiment of the present invention, A designates an accessory seat attachment which can be removably secured to the existing seat structure S of a conventional two-wheeled motor vehicle M, such as a motorcycle, motorbike, motorscooter, or the like. The seat structure S is generally constructed in a similar manner for most of these vehicles and includes a frame 1 which is U-shaped in vertical cross-section. The frame 1 is normally formed of a metal, plastic, or synthetic resin material, or other structural material and is provided with brackets or similar fastening members (not shown) for attachment to a frame portion or other structural member on the motor vehicle M.

Figures 3, 4:
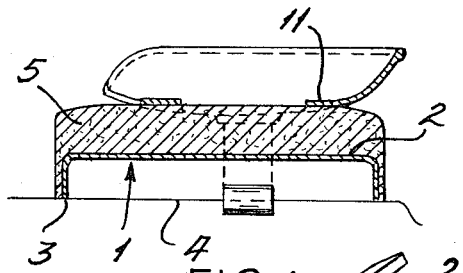
FIG. 3 is a side elevational view of the seat attachment of the present invention and showing the seat attachment secured to the existing seat structure of the motorcycle.
FIG. 4 is a horizontal sectional view taken along line 4—4 of FIG. 2.

By reference to FIGS. 3 and 4, it can be seen that the frame 1 is provided with a horizontal plate 2 having integrally formed depending transverse end walls 3 and depending longitudinal side walls 4. Furthermore, a seat cushion or pad 5, formed of a somewhat rigid, but yet sufficiently resilient foam material, is permanently secured to the frame 1. A suitable adhesive, such as an epoxy resin can be conventionally used to secure the pad 5 to the frame 1. The pad 5 is usually provided with an outer cover (not shown), which is generally formed of a leather or suitable plastic material, such as a thin vinyl chloride film, to provide protection against exposure and render a desired asthetic appearance.

The seat attachment A of the present invention includes an outer frame or shell 10 which is preferably molded from a suitable plastic or synthetic resin material, such as a rigid polyethylene, various polyvinyl compounds such as polyvinyl chloride, various vinylidene resins, polybutadiene, polystyrene phenolic resins, or any of a number of other well known plastic materials. The shell 10 can also be fabricated from metals, such as lightweight aluminum or a thin-gaged steel. By reference to FIG. 1, it can be seen that the shell 10 has an overall size and shape somewhat similar to a saddle of the type normally used by equestrians, and is designed to support the buttocks of a human occupant when in the seated position.

The shell 10 generally includes a base wall 11, somewhat U-shaped in horizontal cross-section, and which is comprised of a pair of spaced opposed leg portions 12 connected by a bight portion 13. Upstanding arcuately shaped side walls 14 are integrally formed with the leg portions 12 of the base wall 11 and the side walls 14 integrally merge into a somewhat arcuately shaped upstanding back wall 15. A connecting strip 16 integrally connects the two spaced opposed leg portions 12 forwardly of the bight portion 13. The base wall 11 is also slightly arcuate in vertical cross-section, so that the bight portion 13 and the connecting strip 16 have slightly raised portions in the region intermediate the two leg portions 12.

The connecting strip 16 is cut away along its forward margin in the provision of a transversely extending slot 17, thereby forming two forwardly extending thigh receiving sections 18. Furthermore, because of the slight arcuate shape in the vertical dimension, the thigh receiving sections 18 are located slightly below the raised portions of the bight portion 13 and the connecting strip 16.

Figures 2, 6, 7:
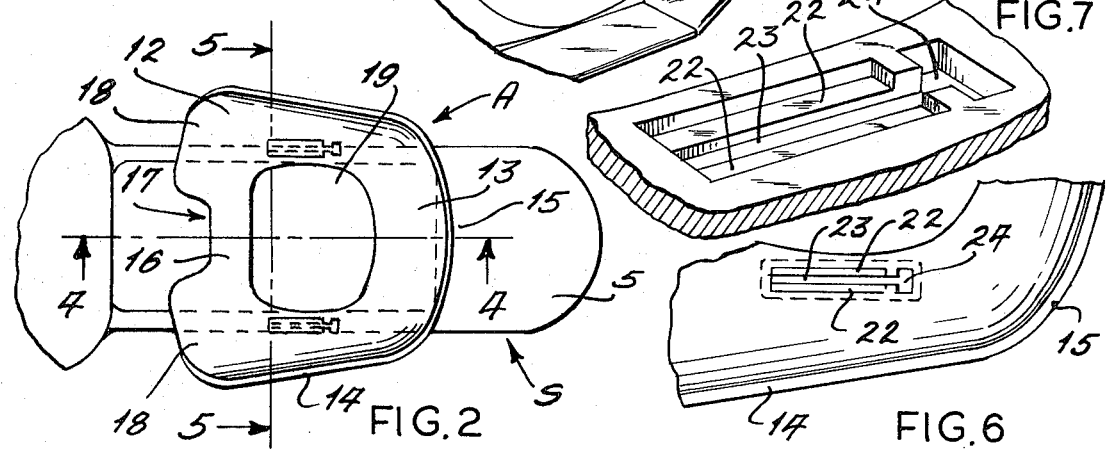
FIG. 2 is a top plan view of the seat attachment of the present invention and showing the seat attachment secured to the existing seat structure of the motorcycle.
FIG. 6 is an enlarged top plan view showing a portion of the frame forming part of the seat attachment of the present invention with an elongated hook receiving slot formed in the shell of the seating attachment.
FIG. 7 is a perspective view, partially broken away, showing the details of construction of the elongated slot appearing in FIG. 6.

By reference to FIGS. 1 and 2, it can be seen that the base wall 11 is provided with a somewhat rectangularly shaped, enlarged aperture 19 formed by the U-shaped base wall 11 and the connecting strip 16. Furthermore, it can be observed that the aperture 19 has a transverse dimension which is approximately equal to the transverse dimension of the pad 5 forming part of the seat structure S.

Integrally formed with the two leg portions 12 of the base wall 11 in the region of the aperture 19, and extending downwardly therefrom, are a pair of opposed transversely spaced enlarged hubs 20. The enlarged hubs 20 are provided with notched side walls 21 approximately in engagement with the longitudinal side walls of the pad 5. The hubs 20 are also internally provided with a pair of vertically recessed spaced opposed shoulder-forming walls 22, thereby forming an elongated slot 23 in the manner as illustrated in FIGS. 6 and 7. It can be observed that the elongated slot 23 opens into an enlarged keyway 24 which communicates with the elongated slot 23.

Figures 5, 8:
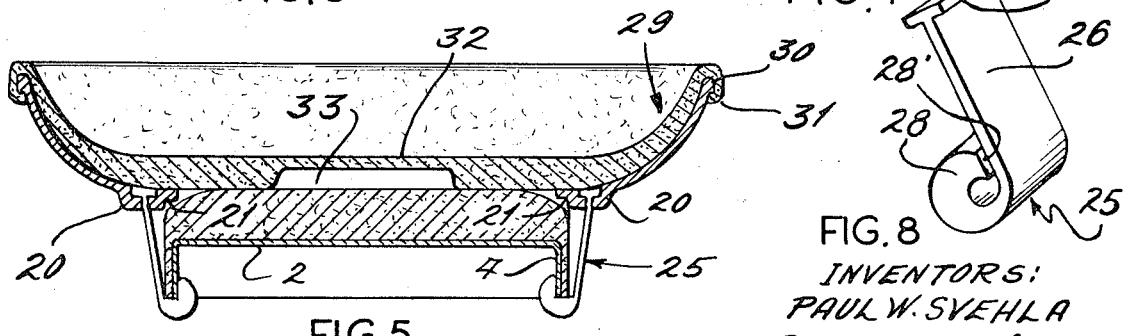
FIG. 5 is a horizontal sectional view taken along line 5—5 of FIG. 2, and showing a cushion operatively attached to a frame forming part of the seat attachment of the present invention.
FIG. 8 is a perspective view showing an elastic fastener used to secure the seat attachment to the existing seat structure of the two-wheeled vehicle.

By reference to FIGS. 3–5, it can be observed that the seat attachment A is partially conformable to the upper surface of the seat structure S and is retained thereon by means of a pair of resilient fasteners 25. The fasteners 25 are preferably formed of a somewhat resilient material, such as a neoprene rubber and can be extruded in long sections and cut or sliced to form individual fasteners of proper size. The fasteners 25 are more fully illustrated in FIG. 8 and each fastener 25 generally comprises a shank 26 which integrally merges into an enlarged head 27 at one end thereof and into a U-shaped enlarged hook-like flange 28 at the other end thereof. The flange 28 terminates in a blunt or flat end wall 28' facing the shanks 26 in the manner illustrated in FIG. 8. The shanks 26 are sized to extend through the elongated slots 28 in the enlarged hubs 20. It can be observed that the hook-like flanges 28 are relatively thick with respect to the shank 26 of any fasteners 25, so that internal stresses are introduced into the hook-like flanges 28 when the fasteners 25 are formed in the extrusion process. Inasmuch as the hook-like flanges 28 are resilient, the flanges 28 can be stretched somewhat so as to engage the lower margins of each of the depending longitudinal side walls 4 forming part of the seat structure S.

It can be observed that the fasteners 25 can be introduced into the elongated slots 23 in the hubs 20 by threading the heads 27 and shanks 26 through the keyways 24 and then into the elongated slots 23. This combination is unique in that the enlarged heads 27 can first be urged through the keyways 24 and rotated in such manner that the shanks 26 are shifted into the regions of the elongated slots 23. Furthermore, the elongated slots 23 are sized so that the shank 26 of the fasteners 25 can be snuggly, but nevertheless removably accommodated. The enlarged heads 27 will bear against the shoulder-forming walls 22 and further, since as the shoulder-forming walls 22 are recessed, the upper surface of the heads 27 will be flush with the upper surface of the base wall 11 in the region of the hubs 20.

A cushion 29, preferably formed of a relatively soft foam-like material, such as a polyurethene foam, is formed on and substantially covers the upwardly presented surface of the shell 10 in the manner as illustrated in FIG. 5. The cushion 29 can be conveniently molded to the upper surface of the shell 10 by first inserting the shell 10 in a split mold and then adding a liquid foam material, such as polyurethene foam. When the mold is closed, the material will effervesce within the mold, thereby forming a resilient foam which becomes firmly bonded to the surface of the shell 10. The surface of the foam cushion thus formed will assume a richly textured leather-like appearance from the mold.

While the above described system of forming a cushion is the preferred form, it should also be recognized that the cushion 29 could be formed as an integral individual member which is rigidly secured to the shell 10 by means of a suitable adhesive, such as an epoxy resin, or by any other conventional means. Furthermore, a leather or plastic outer layer (not shown) may overwrap the cushion 29 for the purpose of providing a protective covering and for rendering a desired asthetic appearance. The side walls 14 and the back wall 15 are integrally provided with an outwardly struck head 30, as illustrated in FIGS. 4 and 5. In addition, the cushion 29 could be provided with downwardly struck flange portions 31 along the exterior of its upper peripheral margin. These flange portions 31 are disposed over the outwardly struck head 30 for retentive engagement therewith.

By further reference to FIG. 5, it can be seen that the cushion 29 is provided with an area of reduced thickness 32 so that a gap or space 33 exists between a portion of the cushion 29 and the upwardly presented surface of the pad 5 on the seat structure S, in the region of the enlarged aperture 19. It can be observed that the area of reduced thickness 32 is somewhat smaller in transverse dimension than the transverse dimension of the enlarged aperture 19. In this manner, the cushion 29 is somewhat yieldable in the area of reduced thickness 32 so that it can extend downwardly through the enlarged aperture 19 and into the space 33 under the weight of an occupant. The cushion 29 is constructed so that the amount of yielding of the area of reduced thickness 32 is limited, but is yet sufficient to lightly engage the upwardly presented surface of the pad 5 and cooperate therewith for providing a soft cushioning effect for the occupant of the seat attachment A. Thus, the occupant may be partially supported by the cushion 29 in the region of the enlarged aperture 19 and partially supported by means of the pad 5 on the seat structure S.

It should be observed that the seat attachment A can be removably secured to a wide variety of existing seat structures and is not necessarily limited to securement to a vehicle seat structure of the type shown herein. In addition, the seat attachment A can be secured to members other than an existing seat structure. Furthermore, it can be observed that the seat attachment A could be provided with securement means for permanent attachment to either the existing seat structure or other structural member of the motor vehicle.

In use, the seat attachment A is removably secured to a seat structure S of the vehicle M by inserting a fastener 25 in each of the elongated slots 23. The heads 27 will engage the shoulder-forming walls 22 to securely hold the fasteners 25 in position. The hook-like flanges 28 on the lower ends of each of the shanks 26 are then stretched to engage the lower margins of the longitudinal walls 4 on the seat structure S. As this occurs, the shell 10 is essentially centered on the upper surface of the pad 5 and is rigidly supported thereon. In addition, the downwardly extending enlarged hubs 20 aid in the centering of the shell 10 on the seat structure S. When the hook-like flanges 28 are engaged with the lower margins of the vertical walls 4, the seat attachment A is securely held in place and can only be removed by stretching the hook-like flanges 28 with respect to the vertical walls 4 and slipping the same beyond the lower margins of the walls 4.

The occupant of the vehicle M is essentially centered in and supported by the seat attachment A due to the shape of the shell 10 and the cushion 29 is disposed thereon. Furthermore, the buttocks of the occupant is supported approximately in the area of reduced thickness 32 so that the weight of the occupant will cause this portion of the cushion 29 to yield and extend downwardly somewhat through the enlarged aperture 19 into the gap 32. Additional support for the occupant is then provided by means of the pad 5 on the existing seat structure S. In this manner, the seat attachment A affords good stability to the occupant and also lends itself to a high degree of comfort.

The seat attachment A can readily be made in the form of a kit which can be conveniently distributed and sold to motorcycle enthusiasts and the like. The seat attachment A can be packaged so that simple assembly can be performed by the user, requiring securement of the cushion 29 and the fasteners 25 to the shell 10; or it can be packaged as a completely assembled product requiring only attachment to the vehicle M. In addition, it can be observed that the seat attachment A is constructed in such fashion that a plurality of these attachments are nestable for convenience and cost reduction in shipping.

Thus, there has been shown and described a novel seat attachment for two-wheeled motor vehicles and the like, which is capable of being removably attached to the existing seat structure of the vehicle and provides a high degree of comfort with an improved safety factor, and in this manner, fulfills all of the objects and advantages sought therefor. It will be apparent, however, to those skilled in the art that many changes could be made in the embodiment disclosed without departing from the spirit and scope of the invention, including use of other materials of construction, other shapes for the shell, etc. All such changes, including variations, modifications and adaptations thereof which do not depart from the spirit and scope of the invention are deemed to be covered by the invention, which is limited only by the claims which follow.

Having thus described our invention, what we desire to claim and secure by Letters Patent is:

1. An accessory seat attachment for motor vehicles having a seat thereon which is capable of supporting a human body, said seat attachment comprising seat frame forming means having a downwardly presented wall at least partially conformable to the seat of said vehicle, said frame forming means having an enlarged aperture therein in the region which would be capable of engaging the buttocks of a human body, cushion means disposed on said frame forming means and having a portion over said enlarged aperture spaced upwardly from said downwardly presented wall with respect to the seat on said motor vehicle so that a space exists between an upwardly presented surface on said seat of said motor vehicle and the last named portion of said cushion means, said cushion means being yieldable somewhat through said enlarged aperture under the weight of an occupant so that said last named portion of said cushion means extends partially downwardly through said enlarged aperture, and attachment means for attaching said accessory seat attachment to said vehicle.

2. The accessory seat attachment of claim 1 further characterized in that said accessory seat attachment is attached to the seat of said vehicle.

3. The accessory seat attachment of claim 1 further characterized in that an upstanding member is carried by said frame forming means for retaining an occupant on said seat attachment.

4. The accessory seat attachment of claim 2 further characterized in that the seat on said motor vehicle has a pair of opposed side walls, and that said attachment means comprises a pair of attachment elements, each of which enables attachment to said opposed side walls.

5. The accessory seat attachment of claim 1 further characterized in that said motor vehicle is a two-wheeled motor vehicle having an elongated seat member with a pair of side walls, the frame forming means of said accessory seat attachment being disposed over and extending beyond the side walls of said frame forming means.

6. The accessory seat attachment of claim 2 further characterized in that the seat on said motor vehicle has a pair of transverse side walls with flange forming means on the lower ends of each of said side walls, and that said attachment means comprises a hook-like element on each side of said frame forming means attached to said frame forming means, each of said hook-like elements being engageable with said flange forming means on each of said side walls for securely holding said accessory seat attachment on the seat of said motor vehicle.

7. The accessory seat attachment of claim 3 further characterized in that said upstanding member is integrally formed with said frame forming means and that said frame forming means is formed of a synthetic resin material.

8. The accessory seat attachment of claim 7 further characterized in that said cushion means is rigidly attached to said frame forming means and that said accessory seat attachment is removably secured to the seat of said motor vehicle.

9. An accessory seat attachment for removable attachment to two-wheeled motor vehicles and the like, which vehicles have an elongated seat capable of supporting the buttocks of a human body, said elongated seat having a pair of spaced transverse side walls with lower margins on the lower ends of each of said side walls; said accessory seat attachment having a plastic frame somewhat conforming to the buttocks of a human body, an upstanding member integrally formed with said frame and extending around a rear margin and two side margins of said frame, a downwardly presented wall on the underside of said frame and at least partially conforming to the elongated seat on said motor vehicle, said frame having an enlarged aperture in the region which would be capable of engaging the buttocks of a human body, cushion means rigidly secured to said frame and being disposed over said enlarged aperture, said cushion means being somewhat yieldable under the weight of an occupant so that a portion of said cushion means extends partially downward through said enlarged aperture, a hook-like element extending downwardly from each pair of opposed sides of said frame and being engageable with said lower margins for securely holding the accessory seat attachment on the elongated seat of said motor vehicle.

10. An accessory seat for use with motor vehicles and the like, said seat comprising a somewhat arcuate U-shaped base wall, a cross member integrally formed with and extending across said base wall, said U-shaped base wall and cross member forming an enlarged aperture located in an area to receive the buttocks of a human body, a pair of spaced forwardly extending leg receiving members integrally formed with said base wall and cross member for supporting a portion of the thighs of a human body, a downwardly extending portion on said base wall and having a surface which lies in a plane vertically beneath the plane of said enlarged aperture, an upstanding peripheral wall integrally formed with and extending around said U-shaped base wall and a portion of each of said leg receiving members, and a plurality of downwardly extending elements formed with said base wall, each of said downwardly extending elements having elongated apertures therein for receiving hook elements, whereby said hook elements are capable of removably attaching said accessory seat to said motor vehicle.

11. The accessory seat of claim 10 further characterized in that a cushion is supported by and secured to said base wall, cross member and leg receiving members.

12. The accessory seat of claim 11 further characterized in that said cushion is also supported by and secured to said peripheral wall.

13. The accessory seat of claim 10 further characterized in that said hook element has an enlarged head and a connecting strip, and further that said downwardly extending elements are provided with a pair of inwardly extending opposed flanges which engage the head on said hook element, said flanges being spaced from each other to render said elongated apertures with a size sufficient to accommodate said connecting strip.

14. The accessory seat of claim 10 further characterized in that said base wall has a lower surface which is sized to engage with and partially conform to an elongated seat on a two-wheeled motor vehicle.

15. The accessory seat of claim 14 further characterized in that said elongated seat has a pair of spaced walls with lower margins, and that said hook elements are sized to engage the lower margins of said spaced walls.

16. For use with a two-wheeled motor vehicle having an elongated seat thereon; an accessory seat attachment for removable attachment to said elongated seat, said accessory seat attachment comprising frame means, cushion means supported by said frame means and extending over an aperture in said frame means, said cushion means being located thereon so that a portion of the lower surface of said cushion means is spaced upwardly from the upper surface of said elongated seat, said cushion means being somewhat resilient to extend slightly downwardly through said aperture under the weight of an occupant, and attachment means on said frame means for removably attaching said frame means to said elongated seat.

17. An accessory seat for use with motor vehicles and the like, said seat comprising a somewhat arcuate U-shaped base wall, a cross member integrally formed with and extending across said base wall, said U-shaped base wall and cross member forming an enlarged aperture located in an area to receive the buttocks of a human body, a pair of spaced-apart forwardly extending leg receiving members extending outwardly from said base wall and cross member for supporting a portion of the thighs of a human body, a downwardly extending portion on said base wall and having a surface which lies in a plane vertically beneath the plane of said enlarged aperture, an upstanding peripheral wall extending around said U-shaped base wall and a portion of each of said leg receiving members, and a plurality of hook elements extending downwardly from said base wall for removably attaching said accessory seat to said motor vehicle.

18. An accessory seat attachment for motor vehicles having a seat thereon which is capable of supporting a human body, said seat attachment comprising seat frame forming means, said frame forming means having an enlarged aperture therein in the region which would be capable of engaging the buttocks of a human body, cushion means disposed on said frame forming means and being yieldable somewhat through said enlarged aperture under the weight of an occupant, said frame forming means having a pair of spaced apart elongated slots, shoulder means located in proximity to each of said elongated slots, and a flexible and slightly stretchable hook-like member on each side of said frame forming means extending through an elongated slot and engageable with the shoulder means associated with such slot for removably attaching said accessory seat attachment to said vehicle.

* * * * *